UNITED STATES PATENT OFFICE.

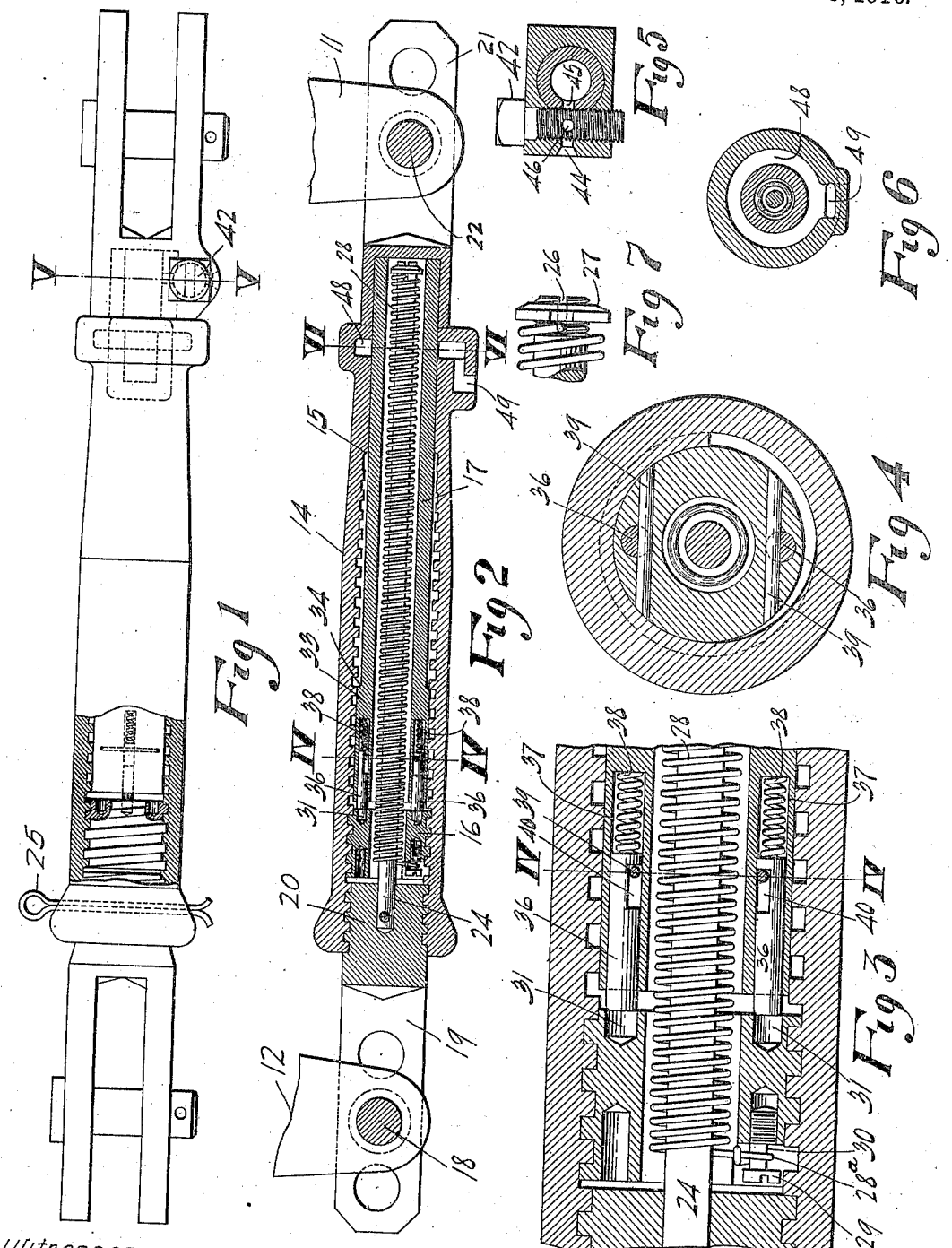

WILLIAM KELLEY PRICE, OF NEW CASTLE, PENNSYLVANIA.

SLACK-ADJUSTER FOR CAR-BRAKES.

951,577.  Specification of Letters Patent.  Patented Mar. 8, 1910.

Application filed June 26, 1908. Serial No. 440,598.

*To all whom it may concern:*

Be it known that I, WILLIAM KELLEY PRICE, a resident of New Castle, in the county of Lawrence and State of Pennsylvania, have invented a new and useful Improvement in Slack-Adjusters for Car-Brakes, of which the following is a specification.

This invention relates to slack adjusters for railway car trucks.

The object of the invention is to provide automatically operating mechanism for taking up the slack in the brake mechanism due to wear on the brake shoes and other causes, and also to provide mechanism which will permit the brake shoes when released to move only a constant fixed distance away from the wheels.

The invention comprises an automatic turn buckle in the brake applying mechanism constructed and arranged as hereinafter described and claimed.

In the accompanying drawings Figure 1 is in part a plan view of the turn buckle and in part a horizontal section through the same; Fig. 2 is a vertical sectional view through the same; Fig. 3 is an enlarged view of a portion of Fig. 2; Figs. 4, 5 and 6 are transverse sections taken respectively on the lines IV—IV, Fig. 2, V—V, Fig. 1, and VI—VI, Fig. 2; and Fig. 7 is a detail view of the end of a fixed rod showing the means for holding the end of the spring.

My improved slack adjuster is intended to be applied to a truck of any kind and can be placed in any suitable position in the brake applying mechanism. It is, however, preferably applied as a bottom brake rod, that is, between the live and dead levers of the brake mechanism, in the manner shown and described in Patent No. 872,540 granted Dec. 3, 1907 to William G. Price. The brake mechanism also preferably will be so constructed that considerable friction exists in the brake hangers, tending to restrain the brake shoes from dropping away from the wheels, such as the use of springs on the fulcrums of the brake hanger, as described in said Patent No. 872,540. I have not deemed it necessary to illustrate the brake shoes and brake applying mechanism, as the same are well known and will be understood by reference to the said Patent No. 872,540.

In the drawings the live lever of the brake mechanism is shown at 11 and the dead lever at 12. These levers will be connected to the brake shoes, to the truck, and to the brake actuating mechanism as is usual. My brake adjuster is applied as a connecting rod between the lower ends of the live and dead levers. It comprises essentially a turn buckle which is automatically expanded by means of a tension or torsional spring in order to take up the slack due to the wear of the shoes and other causes. The turn buckle comprises an outer tube or sleeve member 14 which is threaded internally from one end up to a shoulder 15 and from thereon is of reduced internal size, together with a threaded or screw block 16, and an internal reciprocating member 17 also in the form of a tube. The outer sleeve member is connected to one of the brake levers by means of a pin 18 extending through the brake lever and through a jaw 19. The latter has a threaded extension 20 which screws into the end of the outer sleeve tightly so as to make a water tight fit at this point. The internal reciprocating member or tube 17 has connected to its outer end a jaw 21 which is connected by pin 22 to the other brake lever.

A rod or bar 24 has a driven fit in an opening in the jaw 20 and extends through the inner tube 17. It is further secured in place by means of a cotter pin or the like 25 driven into holes through the outer sleeve, the jaw 20 and the end of said rod. At its outer end this rod or bar is provided with a slot 26 and is threaded to receive a threaded collar 27. A helical spring 28 surrounds the rod and has its outer end bent inwardly and projecting into the slot 26 in the rod or bar 24, and is held therein by the collar 27. The opposite end of the spring is provided with a loop 28$^a$ which is secured to the screw block 16 by means of a tap screw or bolt 29, said screw being flattened off on one side as at 30 so that the tension of the spring acting on the flattened portion of the bolt prevents the latter from turning. The rod 24 forms a fixed abutment to which one end of the spring is connected.

The screw block 16 on its outer face is provided with suitable ratchet means, such as the openings or sockets 31 formed in the end face of said block. The drawings show four such openings or sockets. The inner tube or piston 17 at its inner end is enlarged, as at 33, to form shoulder 34 with which the shoulder 15 in the outer tube coöperates to limit the outward movement of said inner tube. The inner end of the inner tube is provided with one or more pawls 36, two such pawls being shown having a sliding fit in holes 37 formed in the end of the tube. These pawls, normally, are pressed outwardly or into engagement with the screw block 16 by means of helical springs 38 seated in the bottoms of the holes 37. The longitudinal movement of the pawls 36 is restricted and restrained by transverse pins 39 extending through notches or slots 40 in the pawls. These pins limit the extent to which the pawls can be projected outwardly.

The jaw 21 is secured to the inner tube 17 by being provided with a socket into which said tube projects and having a threaded bolt 42 extending down through a threaded hole in said jaw in such position that the threads of the bolt engage threads cut in the side face of the inner tube. The jaw is provided with a hole 44 intersecting the bolt hole and the inner tube is provided with a hole 45 in alinement with the hole 44. The bolt is provided with a transverse hole 46 which can be turned so as to register with the holes 44 and 45, so permitting of the use of these holes to supply oil to the interior of the turn buckle, while by turning the bolt so as to bring the hole 46 out of register with the holes 44 and 45, the oil hole is closed up so as to prevent the entrance of dirt and water. The bolt acts as a cock for the oil hole.

The outer end of the outer sleeve 14 is provided with an internal annular groove 48 surrounding its bore and registering with a port 49 leading to the exterior. The groove 48 forms a gutter which collects moisture or water entering around the same and conducts the same through the downwardly extending port 49 to the outside, thus preventing water from getting into the inside of the turn buckle. The port 49 is placed so as to be out of alinement with the groove 48 so water cannot splash up through the port into the groove.

Figs. 1 and 2 show the adjuster in its shortened condition in which it is ready for connection to the live and dead levers. To put the adjuster in this shortened condition the jaw 21 is rotated with the pawls 36 in engagement with the holes 31 in the screw block 16. This turns the screw block into the tube 14 and drives said block to the end of the tube as shown. Since the spring 28 at one end is fixed to the rod or bar 24 which acts as a fixed abutment and its opposite end is fixed to the screw block, the rotation of the latter winds up the spring and also lengthens the same, so putting it both under longitudinal and torsional tension. When the brakes are applied the inner tube 17 is forced against the screw block 20, the latter acting as an abutment to limit the inward movement of said inner tube. If at this time the pawls 36 are out of alinement with the holes 31 they are forced back into the holes 37, compressing the springs 38. When the brakes are released, since the brake shoes are retarded in their movement away from the wheels, the effect is to cause the inner tube 17 to pull a slight distance out of the outer tube, thereby causing the end of said inner tube to be drawn slightly away from the screw block 16. If the brake shoes are new the amount of slack is not sufficient to permit the pawls 36 being drawn entirely out of the holes 31. When, however, the brake shoes have become worn sufficiently the outward movement of the inner tube draws the pawls 36 entirely out of the holes 31. The effect of this is to release the screw block 16 so that the latter is revolved by the spring 28 and moved in a direction toward the inner tube 17, until brought into such proximity thereto that the pawls again enter the holes 31. This action continues as the shoes wear away until the latter are worn out. The distance that the pawls 36 project beyond the end of the tube 17 governs the distance that the shoes can be moved away from the wheels. In other words, if the slack or combined distance between the two shoes and the wheels is greater than the projection of the pawls the latter will be entirely drawn out of the openings or holes and the screw block automatically adjusted by the spring. Consequently the distance of each shoe from its wheel is always slightly less than one-half of the projection of the pawls. By providing pawls of greater or less projection the distance between the wheels and shoes can be regulated as described. The pawls and the holes 31 in the end of the screw block form in effect ratchet and pawl mechanism which serves as an escapement to control the action of the spring 28.

By the use of the slack adjuster described the shoes are automatically adjusted so that they are always at practically a predetermined fixed distance from the wheels when released. They can never be too tight or too loose. With hand methods of adjustment it frequently occurs that the shoes are adjusted too tight, so causing a large amount of friction and resulting in great waste of power, unnecessary wear of shoes and wheels and frequently the overheating and burning out of motors. On the other hand accidents are frequently caused by having shoes adjusted too loosely. Neither of these can occur with the slack adjuster described since it acts automatically to keep the shoes at practically a fixed distance from the wheels irrespective of wear.

What I claim is:

1. In a slack adjuster, the combination of brake applying mechanism, a turn buckle in said mechanism, a spring normally under tension and arranged to automatically expand the turn buckle, and ratchet mechanism controlling said spring.

2. In a slack adjuster, the combination of brake applying mechanism, a turn buckle in said mechanism, said turn buckle having an internally threaded member, a screw block therein, and a spring under tension arranged to rotate said screw block and expand the turn buckle.

3. In a slack adjuster, the combination of brake applying mechanism, a turn buckle in said mechanism, a spring in said turn buckle and normally under tension and arranged to automatically expand the same, and a member longitudinally reciprocating in the turn buckle and arranged to restrain the action of said spring.

4. In a slack adjuster, the combination of brake applying mechanism, a turn buckle in said mechanism, a spring in the turn buckle and normally under tension and for automatically expanding the same, and escapement mechanism controlled by the expansion and contraction of the turn buckle and controlling the action of said spring.

5. In a slack adjuster, the combination of brake applying mechanism, a turn buckle in said mechanism, said turn buckle having an internally threaded member, a screw block working therein, a spring arranged to rotate said screw block, and a member reciprocating longitudinally of the turn buckle and arranged to restrain the action of said spring.

6. A turn buckle having an internally threaded member, a screw block working therein, a spring arranged to rotate said screw block, a reciprocating member, and escapement mechanism controlling the spring and controlled by said reciprocating member.

7. A turn buckle comprising an internally threaded member, a reciprocating member therein, a screw block in said internally threaded member forming an abutment for the reciprocating member, a spring arranged to rotate said screw block, and escapement mechanism controlling said spring and controlled by the reciprocating member.

8. In a slack adjuster, the combination of brake applying mechanism, a turn buckle in said mechanism, said turn buckle having an internally threaded member, a screw block in said member, a spring arranged to rotate said block, and ratchet and pawl mechanism for regulating the action of said spring, the extent of slack being regulated by the extent of projection of the pawl.

9. In a slack adjuster, the combination of brake applying mechanism, a turn buckle in said mechanism, said turn buckle having an internally threaded member, a screw block in said member, a spring arranged to rotate said block, a reciprocating element, a pawl carried by said element and projecting beyond the same and arranged to engage holes in the screw block, and means for restraining the distance to which said pawl projects beyond the end of the reciprocating member.

10. A slack adjuster comprising an internally threaded tube, a hollow screw block working therein, a hollow reciprocating member in said tube, and a torsional spring inclosed in said hollow block and reciprocating member and at one end secured to the screw block and at its other end to an abutment fixed with reference to the internally threaded tube.

11. A slack adjuster comprising an internally threaded tube, a screw block in said tube, a helical spring attached at one end to said screw block and at its opposite end to an abutment fixed with reference to the internally threaded tube, said spring being both under torsional and longitudinal tension and arranged to move the screw block longitudinally in the tube, and escapement mechanism for controlling the action of said spring.

12. A slack adjuster comprising an internally threaded tube, a hollow screw block and a hollow internally reciprocating member in said tube, a bar fixed to the outer sleeve and projecting through said block and reciprocating member, a helical spring surrounding said bar and at one end attached thereto and its other end connected to the screw block, and escapement mechanism between said screw block and hollow reciprocating member.

13. A slack adjuster comprising an internally threaded tube, a screw block working therein, a spring arranged to rotate said block, a reciprocating member in said tube and provided on its end with a hole, a pawl slidably mounted in said hole and arranged to engage sockets in the end of the screw block, a spring normally pressing said pawl outwardly, and means for limiting the outward movement of said pawl.

14. A slack adjuster comprising an internally threaded tube, a screw block working therein, a spring arranged to rotate said screw block, a reciprocating member in said tube provided in its end with a hole, a pawl slidably mounted in said hole and arranged to engage sockets in the screw block, a spring normally pressing said pawl outwardly, and a pin extending through a slot in said pawl and arranged to limit its outward movement.

15. A slack adjuster comprising an internally threaded member, a screw block rotatable therein, a helical spring having one end attached to a fixed abutment and its opposite end connected to the screw block, and a bolt provided with a flattened portion engaged by a loop on the spring and engaging a threaded hole in the block.

16. A slack adjuster comprising an automatic turn buckle comprising an external member and an internal member entering the same, a jaw to which said internal member is connected, a bolt for securing said jaw to said member, said bolt, jaw and member being provided with openings arranged to be brought into line and serve as an oil hole.

17. A slack adjuster comprising an automatic turn buckle, comprising an external member, and an internal member entering said external member, said external member having an annular groove around the internal member and a drain hole connecting said groove with the exterior.

18. A slack adjuster comprising an internally threaded tube, and a piston having a reciprocating fit therein, said tube being provided with an annular groove around the piston and with a drain hole extending through its walls and connecting the groove with the exterior.

19. A slack adjuster comprising an internally threaded tube having its opening reduced toward one end, a piston partially inclosed in said tube and being of enlarged diameter near one end, whereby said piston is limited in its outward movement by its enlargement contacting the reduced opening in the tube, and an automatically shifting abutment for said piston in said tube.

20. In a slack adjuster, the combination of brake applying mechanism, a turn buckle in said mechanism, and a spring arranged to automatically expand said turn buckle.

21. In a slack adjuster, the combination of brake applying mechanism, a turn buckle in said mechanism, a spring arranged to automatically expand said turn buckle, and automatically acting stop mechanism arranged to limit the expanding action of the spring to provide clearances between the wheels and brake shoes when released.

22. In a slack adjuster, the combination of brake applying mechanism, a turn buckle in said mechanism, said turn buckle having a threaded longitudinal member, an abutment member having threaded engagement with said longitudinal member, and a spring normally under tension arranged to rotate said abutment member on said longitudinal member and expand the turn buckle.

23. In a slack adjuster, the combination of brake applying mechanism, a turn buckle in said mechanism, said turn buckle having a threaded longitudinal member, an abutment member having threaded engagement with said longitudinal member, a spring arranged to rotate said abutment member, and a longitudinal reciprocating member arranged to control the action of said spring.

24. A turn buckle comprising a threaded longitudinal member, an abutment member having threaded engagement with said longitudinal member, a spring arranged to rotate said abutment member, a longitudinal reciprocating member, and escapement mechanism controlling said spring and controlled by said reciprocating member.

25. In a slack adjuster, the combination of brake applying mechanism, a turn buckle in said mechanism, said turn buckle having an internally threaded member, a screw block therein, a spring under tension arranged to rotate said screw block in one direction to expand the turn buckle, and a reciprocating member arranged to rotate the screw block in the other direction to shorten the turn buckle.

26. In a slack adjuster, the combination of brake applying mechanism, a turn buckle in said mechanism comprising an internally threaded member, a screw block, a spring under tension, and a reciprocating member, the spring acting to revolve the screw block in one direction and the reciprocating member controlling the revolving of the screw block in the other direction.

27. In a slack adjuster, the combination of brake applying mechanism, a turn buckle in said mechanism comprising an internally threaded member, a screw block, a spring under tension, and a reciprocating member, the reciprocating member controlling the tension of the spring.

In testimony whereof, I have hereunto set my hand.

WILLIAM KELLEY PRICE.

Witnesses:
W. W. CUBBISON,
MICHAEL COUT.